(12) United States Patent
Stephens et al.

(10) Patent No.: US 7,051,861 B2
(45) Date of Patent: May 30, 2006

(54) CONVEYING SYSTEM

(75) Inventors: Dale D. Stephens, Sulphur Springs, TX (US); Duane Petersen, Sulphur Springs, TX (US)

(73) Assignee: Ocean Spray Cranberries, Inc., Lakeville-Middleboro, MA (US)

( * ) Notice: Subject to any disclaimer, the term of this patent is extended or adjusted under 35 U.S.C. 154(b) by 0 days.

(21) Appl. No.: 10/167,886

(22) Filed: Jun. 12, 2002

(65) Prior Publication Data

US 2003/0230465 A1  Dec. 18, 2003

(51) Int. Cl.
*B65G 47/26* (2006.01)

(52) U.S. Cl. ............... 198/426; 198/430; 198/433; 198/600

(58) Field of Classification Search ............ 198/426, 198/430, 433, 517, 600, 618, 619.3, 457.03
See application file for complete search history.

(56) References Cited

U.S. PATENT DOCUMENTS

| | | | |
|---|---|---|---|
| 842,210 A * | 1/1907 | Knapp et al. ............ 198/426 |
| 1,755,404 A | 4/1930 | Mayers |
| 1,827,738 A | 10/1931 | Cramer |
| 1,852,556 A | 4/1932 | Cramer |
| 2,828,000 A * | 3/1958 | Hebert ............... 198/418.3 |
| 3,104,004 A * | 9/1963 | Poel et al. ............. 198/367 |
| 3,481,107 A | 12/1969 | Andblad et al. |
| 3,960,266 A | 6/1976 | Becker |
| 4,290,517 A * | 9/1981 | Hafferkamp ............ 198/427 |
| 4,354,590 A * | 10/1982 | Langen ................. 198/426 |
| 4,411,353 A * | 10/1983 | McDole ............... 198/419.33 |
| 4,693,055 A | 9/1987 | Olsen, Jr. et al. |
| 4,697,693 A | 10/1987 | Rajala et al. |
| 4,768,642 A | 9/1988 | Hunter |
| 4,793,465 A | 12/1988 | DiFrank |
| 4,902,192 A | 2/1990 | Ziegler |
| 4,936,077 A * | 6/1990 | Langen et al. ........... 198/419.3 |
| 5,052,544 A | 10/1991 | Anderson |
| 5,133,446 A | 7/1992 | Draghetti |
| 5,199,547 A | 4/1993 | Boldrini et al. |
| 5,269,121 A | 12/1993 | Draghetti |
| 5,275,275 A | 1/1994 | Boldrini et al. |
| 5,347,946 A | 9/1994 | Puckett |
| 5,494,148 A | 2/1996 | Belvederi |
| 5,501,064 A | 3/1996 | Ingram et al. |
| 5,502,950 A | 4/1996 | Moncrief et al. |
| 5,558,489 A | 9/1996 | Moncrief et al. |
| 5,579,895 A | 12/1996 | Davis, Jr. et al. |
| 5,704,758 A | 1/1998 | Davis et al. |
| 5,771,658 A | 6/1998 | Olson et al. |
| 5,927,473 A | 7/1999 | Draghetti |
| 6,105,750 A | 8/2000 | Belvederi |
| 6,112,880 A | 9/2000 | Flix |
| 6,112,881 A | 9/2000 | Osti et al. |
| 6,186,313 B1 | 2/2001 | Spatafora et al. |
| 6,209,706 B1 * | 4/2001 | Tod, Jr. ................ 198/418 |

FOREIGN PATENT DOCUMENTS

DE  3923100  * 1/1991 ............ 198/426

* cited by examiner

*Primary Examiner*—James R. Bidwell
(74) *Attorney, Agent, or Firm*—Fish & Richardson P.C.

(57) ABSTRACT

An apparatus for transporting articles includes a first transporter (e.g. a conveyor) for transporting articles in a line and a member that separates the articles in the line into groups and also removes the groups from the line while the articles continue to be transported.

57 Claims, 7 Drawing Sheets

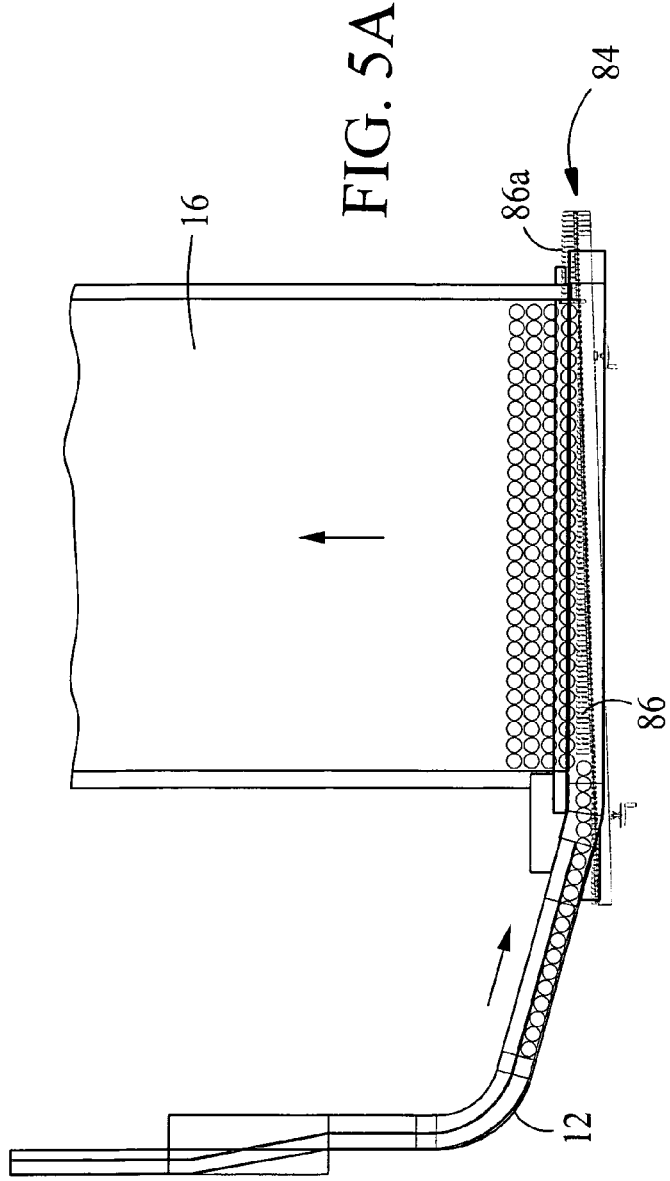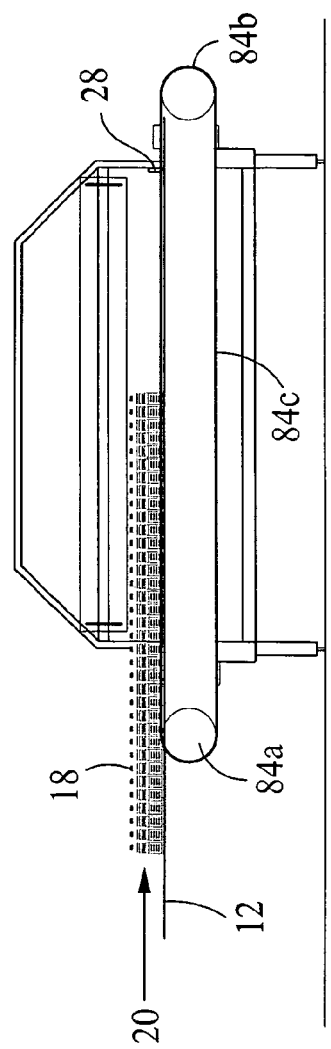

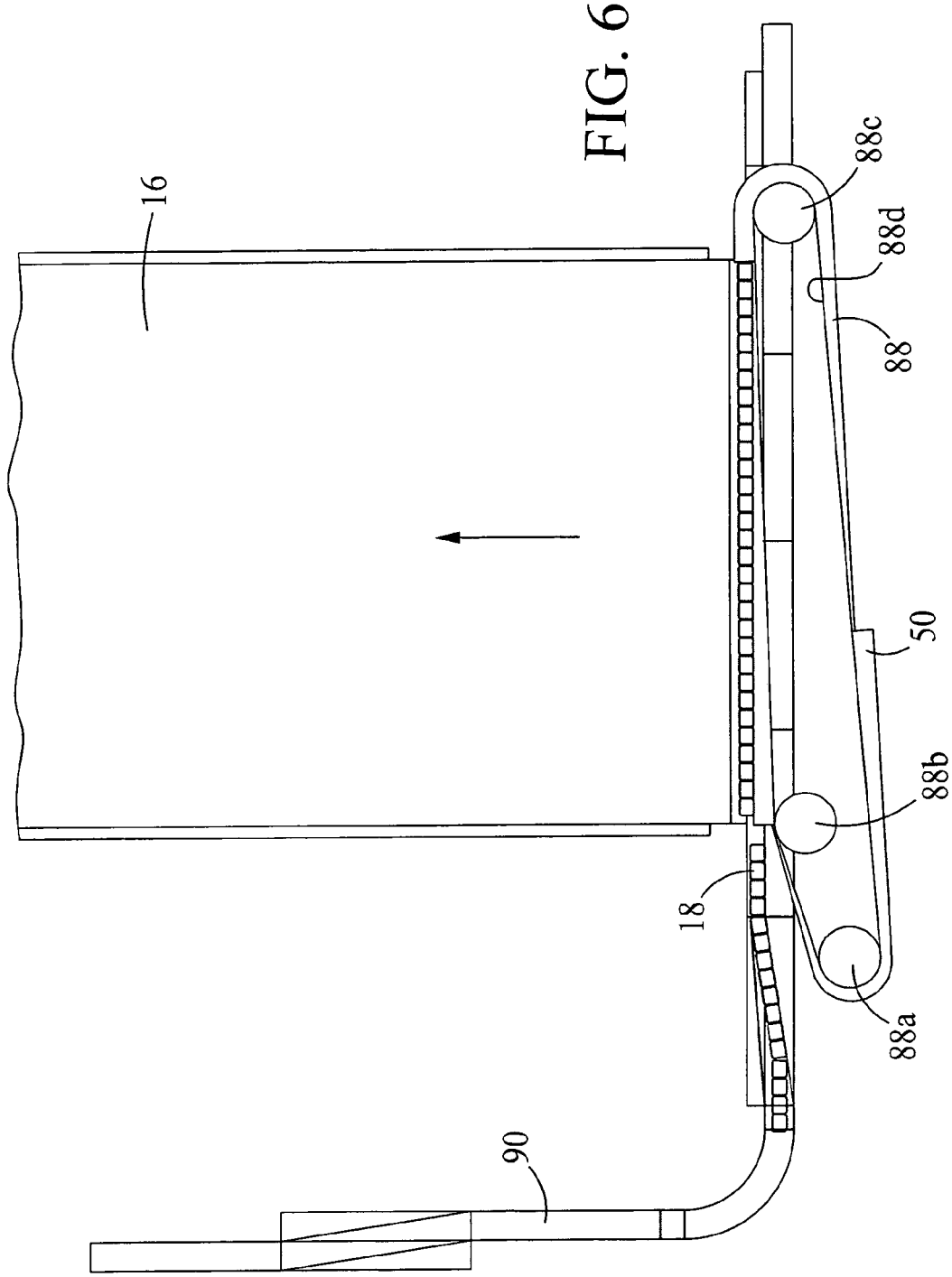

CONVEYING SYSTEM

TECHNICAL FIELD

This invention relates to the handling of containers in a transporter system.

BACKGROUND

Conveying systems are used in bottling plants, where empty bottles are filled with a liquid, such as a beverage. The filled bottles are sealed, labeled, and packaged for distribution.

At the filling stage, the bottle is filled with juice at a temperature sufficiently high to sterilize both the juice and the bottle. After being filled, the bottle is sealed, for instance with a plastic cap, and transferred into a bottle cooler. Often, a stream of bottles is fed single-file on a conveyor that moves them to a transfer apparatus, which then moves the bottles onto a mass flow conveyor through the cooler. The bottles on the mass flow conveyor are massed together, i.e., are no longer in single file.

After cooling to approximately ambient temperature, the bottles can be sent to subsequent areas of the bottling plant.

SUMMARY

In one aspect, the invention features an apparatus for first transporting articles such as beverage containers. The apparatus includes a first transporter (e.g., a conveyor) for transporting articles in a line and a member that separates the articles in the line into groups and also removes the groups from the line while the articles continue to be transported. "In a line", as used herein, refers to articles arranged in parallel that are being moved by the transporters in the parallel direction. "Groups", as used herein, includes two or more, for example, between 2 and 300, preferably between 6 and 70, and more preferably between 12 and 30. Preferably, the articles are transported in a single and/or continuous line.

In a preferred embodiment, the member is a rotator belt that intersects the line of articles. The rotator belt may include, for example, three to five wedges that separate the articles into the groups and push the groups out of the line. The wedge may be flexible; each wedge may be composed, for example, of separated elements of varying lengths.

In other preferred embodiments, the apparatus can include: (1) a blocking member positioned to obstruct the articles; (2) a member for receiving the group of articles from the transporter; and/or (3) a second transporter for receiving and transporting the groups either directly from the first transporter or from the plate (if present).

The apparatus can be used, for example, to transport articles such as beverage containers. The beverage containers can be filled with beverage and sterilized at elevated temperature while in the line. The line often will be moving at a relatively high rate of speed during the filling and sterilizing. Advantageously, the apparatus allows the containers in the line to be automatically divided into groups and moved from the line, for example, onto a mass flow conveyor that moves the containers into a cooler. The mass flow conveyor has a much slower speed than the first transporter, and as a result the apparatus provides a way to separate and transfer groups of containers from a line moving at a relatively high speed to a mass flow conveyor moving at a low speed without having to stop the first transporter or otherwise impede the flow of parallel flow of bottles to make the transfer.

In a second aspect, the invention features an apparatus including the first transporter and a rotator belt that includes wedges that push groups of articles from the line and/or separate the articles into groups while the articles continue to be transported in the line.

In a third aspect, the invention features a method of transporting articles. The method includes transporting a line of articles in a first direction and simultaneously separating a group of the articles from the line and transferring the group out of the line while the line continues to be transported in the first direction. The articles can be, for example, bottles, cans, containers, cartons, pies, loaves, or baked goods. The method may also include transporting the groups in a second direction (for example, a direction that is between 45° and 135°, relative to the first direction) in a mass flow onto, for example, a cooler conveyor.

When the article is a rectangular bottle, in one embodiment the bottles are transported short-side first in the first direction. The separating and transferring may be carried out using the rotator belt with wedges, and the depth of the wedge may be approximately the length of the short side.

In embodiments in which separated and transferred groups of articles are then transported in a second direction, the speed of transport of the line in the first direction can be substantially greater than the speed of transport in the second direction. For example, the speed of transport in the first direction can be more than 25 times the speed of transport in the second direction. The speed in the first direction may be, for example, between 10 and 400 feet per minute (fpm), and the speed in the second direction may be, for example, between 2 and 30 fpm.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 5A is a top plan view of an alternative transfer apparatus;

FIG. 5B is a front view of an alternative transfer apparatus;

FIG. 6 is a top plan view of another alternative transfer apparatus; and

DETAILED DESCRIPTION

Figure 1:
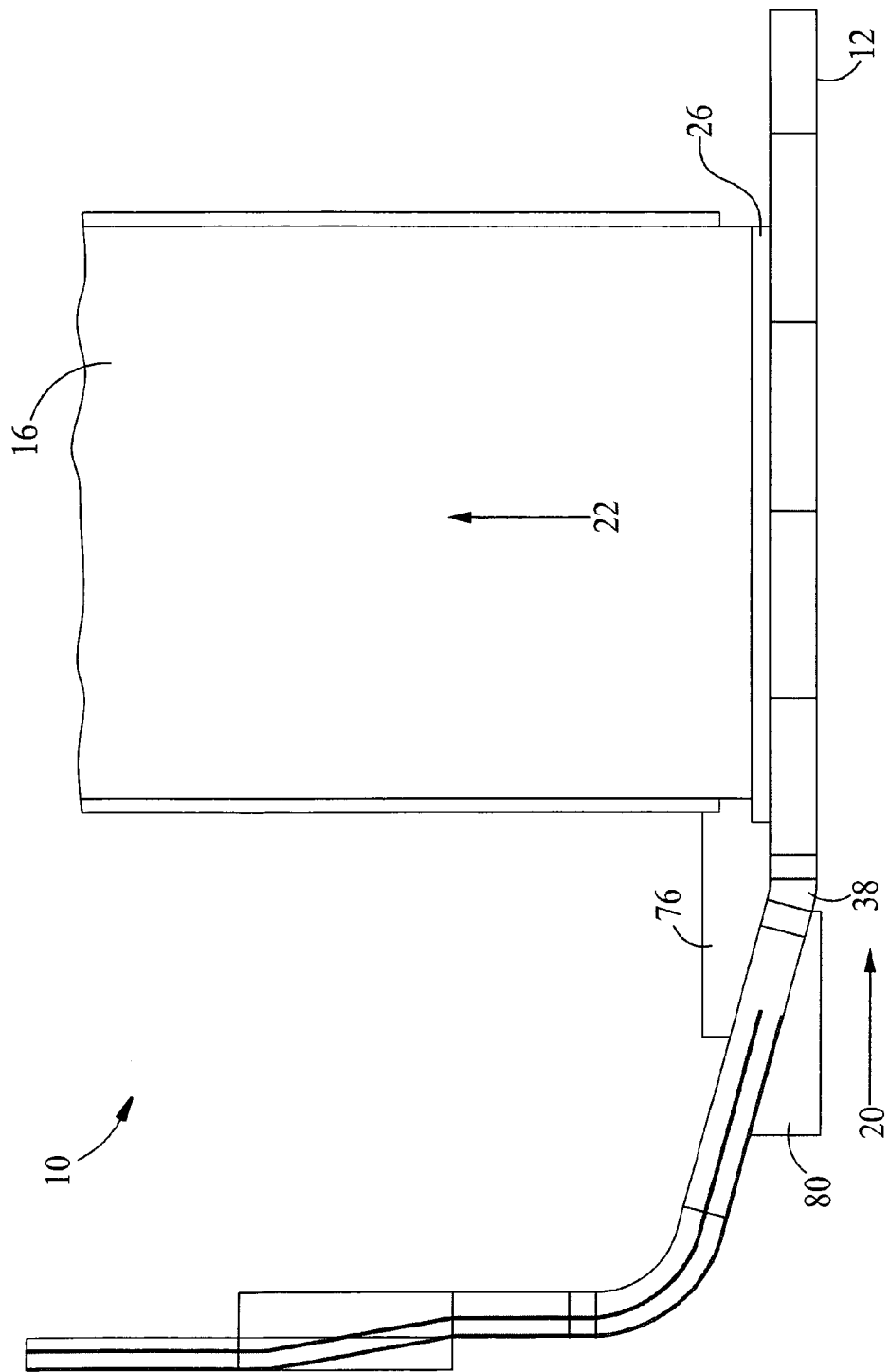
FIG. 1 is a top plan view of a transfer apparatus, without the wedge profile conveyor and with the top to the cooler absent.
Figure 2C:
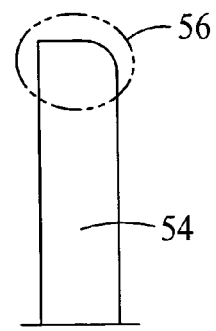
FIGS. 2A–2C are top plan views of the apparatus of FIG. 1, showing an enlarged wedge conveyer and an enlarged finger.
Figure 2B:
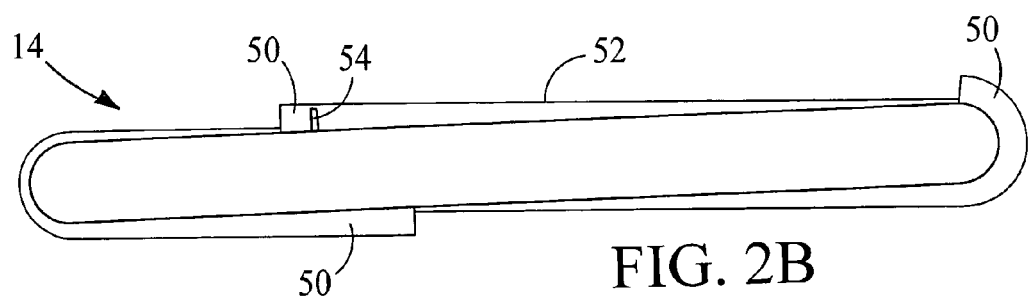
Figure 2A:
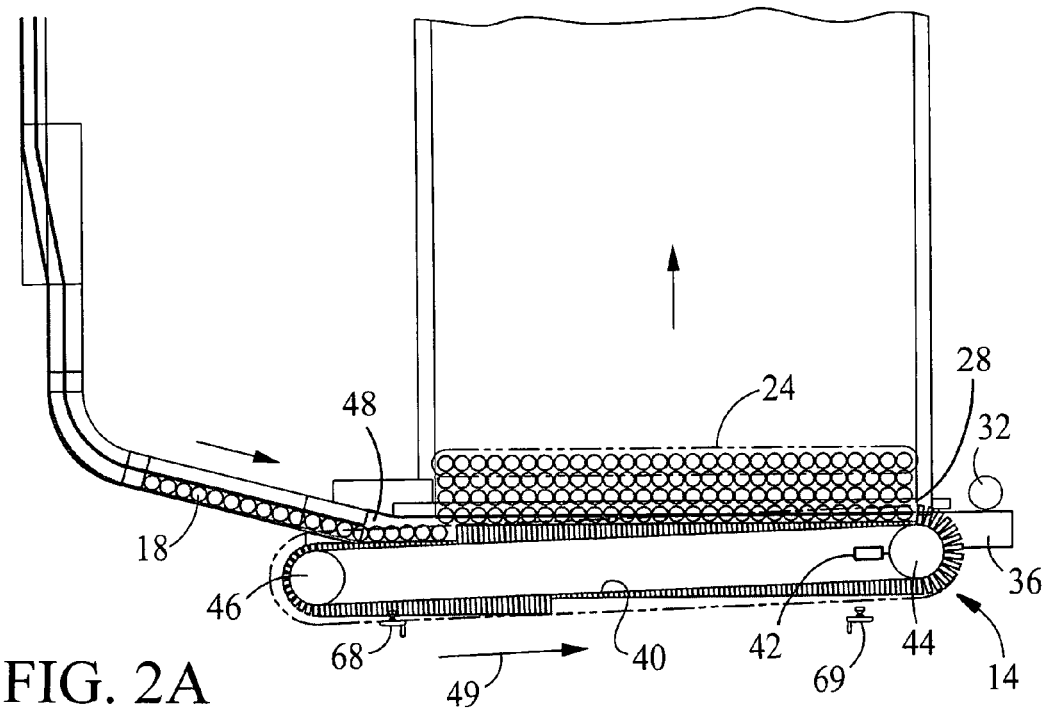
Figure 3:
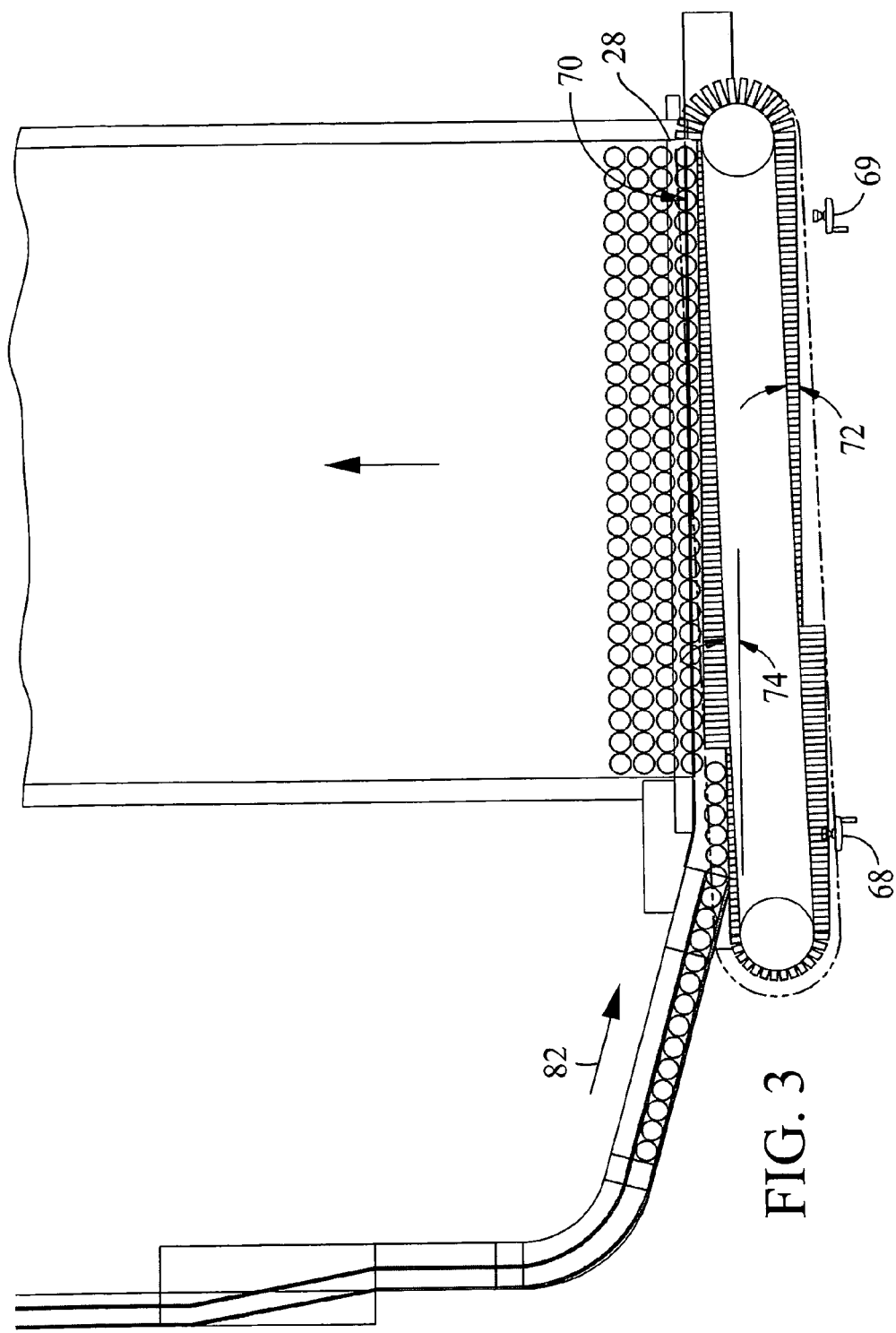
FIG. 3 is a top plan view of the apparatus in FIG. 1, taken subsequent in operation of the apparatus.
Figure 4:
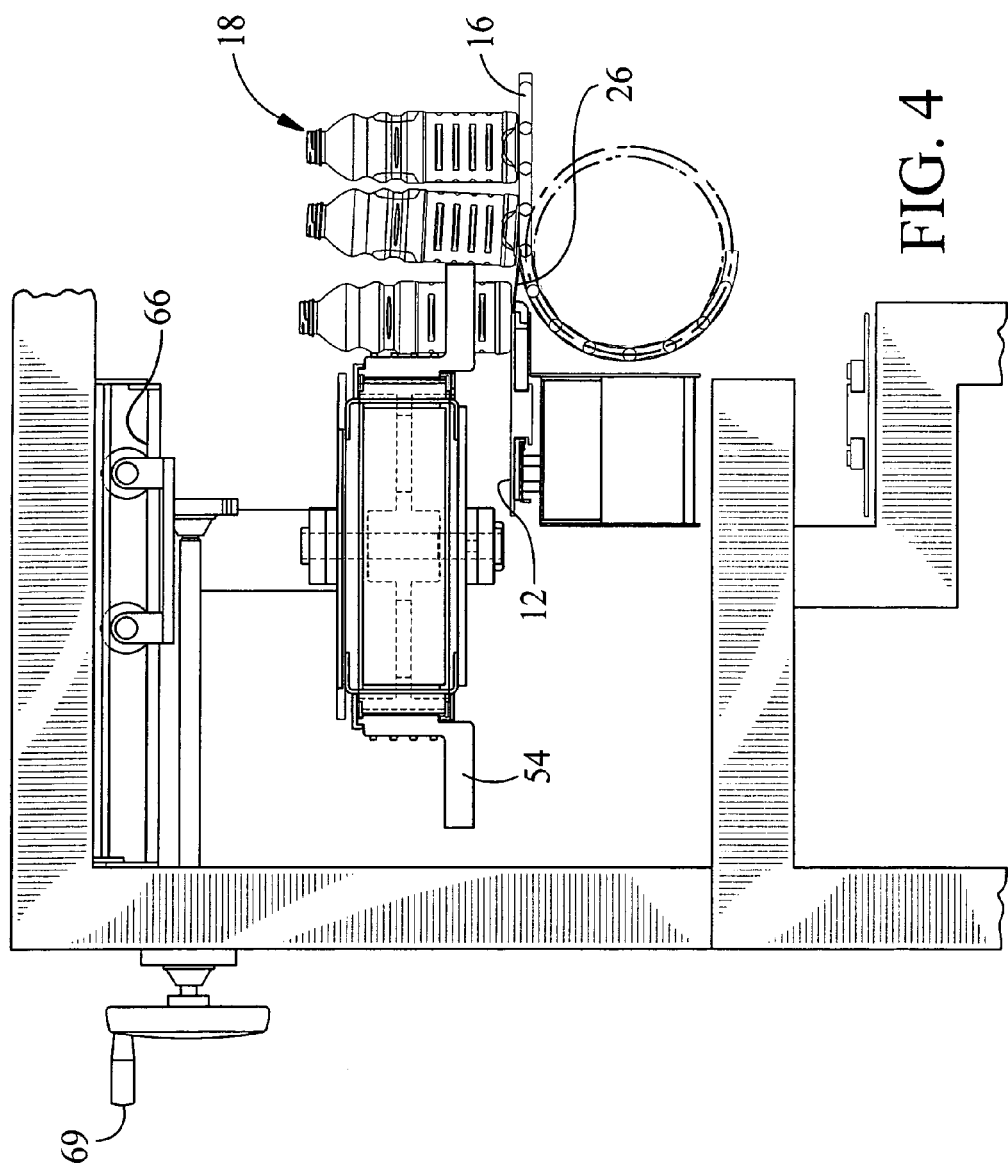
FIG. 4 is a side view of the apparatus in FIG. 1, without the end of the conveyor.

Referring to FIGS. 1–4, a transfer apparatus 10 includes an infeed conveyor 12, a wedge profile conveyor 14, and a mass flow conveyor 16. Infeed conveyor 12 carries bottles 18 in an infeed direction 20. Mass flow conveyor 16 carries bottles 18 in an outflow direction 22. Wedge profile conveyor 14 intersects the path of bottles 18 traveling in direction 20 on infeed conveyor 12.

Wedge profile conveyor 14 transfers groups 24 of bottles 18 off infeed conveyor 12 and toward mass flow conveyor 16. Wedge profile conveyor 14 separates bottles 18 into groups 24 of two or more.

Transfer apparatus 10 also includes dead plate 26, pitched at 7° from mass flow conveyer 16, and row stop 28. Dead plate 26 bridges a gap between infeed conveyor 12 and mass flow conveyor 16. Dead plate 26 receives groups 24 of bottles 18 that are moved by wedge profile conveyor 14 off infeed conveyor 12.

Row stop 28 is rigidly attached to the frame of wedge profile conveyor 14 and is arranged to obstruct the path of bottles 18 on infeed conveyor 12. Row stop 28 blocks bottles 18 that are on infeed conveyor 12, or on dead plate 26, from passing beyond the downstream end of dead plate 26 or beyond the downstream edge of the mass flow conveyor 16, relative to the flow of bottles. Transfer apparatus 10 aligns a group 24 of bottles 18 against row stop 28 as part of the transfer of the group 24 off infeed conveyor 12. Row stop 28 also prevents a downed bottle 18 (for instance, one which may have been knocked over accidentally) from rolling out of transfer apparatus 10.

Infeed conveyor 12 includes infeed drive wheel connected to infeed motor 32. Infeed conveyor 12 also includes infeed belt arranged in an endless loop, which passes around infeed drive wheel. Infeed motor 32 drives infeed drive wheel.

Infeed belt is a tabletop chain. Bottles 18 rest on an upper surface 36 of infeed belt. Infeed belt has a low friction surface, allowing bottles 18 to slide without tipping or becoming scratched. The low friction of the surface also reduces back-pressure among the bottles 18 when the bottles are blocked from traveling on infeed conveyor 12, for instance when bottles 18 are backed up against row stop 28.

Upper surface 36 is slightly inclined toward wedge profile conveyor 14, for example, at an angle of one or two degrees. The incline of upper surface 36 causes bottles 18 to lean into contact with wedge profile conveyor 14.

Infeed conveyor 12 turns the path of bottles 18 at curve 38. After passing curve 38, bottles 18 travel in infeed direction 20. Infeed direction 20 is approximately straight near wedge profile conveyor 14.

Bottles 18 (of the 64 ounce non-round size) are plastic and are filled with juice. Each bottle 18 has a cross-section that is approximately rectangular. Each bottle 18 is sealed with a cap. Bottles 18 are approximately $10^{5}/_{16}$ inches high, $3^{7}/_{32}$ inches wide along a short side, and $4^{5}/_{8}$ inches long along a long side. Bottles 18 are contoured to included vacuum panels and grips. Portions of infeed conveyor 12 include guide rails that help keep bottles 18 upright and oriented short-side first when moving in infeed direction 20.

Wedge profile conveyor 14 includes wedge belt 40 that loops about drive wheel 44 and idle wheel 46 such that interface region 48 of wedge belt 40 intersects the path of bottles 18. Interface region 48 occurs approximately where wedge belt 40 is straight and faces mass flow conveyor 16. Transfer motor 42 drives drive wheel 44. When passing through interface region 48, wedge belt 40 travels in belt direction 49.

Wedge profile conveyor 14 includes three wedges 50. The length of wedge 50 approximates the maximum length of a group 24 to be selected by wedge 50. The length of wedge 50 is slightly less than the width of mass flow conveyor 16; for example, wedge 50 is approximately 10 feet long. Each wedge 50 includes a pushing face 52 and fingers 54 of different lengths.

Fingers 54 are L-shaped. A base portion is upright and affixes to wedge belt 40. All fingers 54 have similarly shaped base portions. An extended portion extends horizontally away from wedge belt 40. Fingers 54 vary in the lengths of their extended portions. Each finger 54 has a pushing tip 56 at the end opposite the base portion. When viewed from above, the extended portions of fingers 54 have cross-sections that are approximately rectangular on three consecutive sides, the second of which is in contact with wedge belt 40. Pushing tip 56 of each finger 54, i.e., the surface that contacts bottles 18, is rounded to reduce friction on, and interaction with, the bottles 18.

The relative position of adjacent fingers 54 can change when wedge belt 40 flexes. The fingers 54 are separable from one another, such that when a portion of wedge belt 40 containing adjacent fingers 54 travels around drive wheel 44 or idle wheel 46, the fingers 54 flare apart. However, when the same portion of wedge belt 40 is substantially straight (for example, within interface region 48), the adjacent fingers 54 are closely spaced. More specifically, wedge belt 40 includes a timing belt that includes teeth spaced at 20 mm intervals. Each tooth has multiple holes 60 for bolting a finger 54 to the tooth. Fingers 54 in a wedge 50 are bolted at regular intervals of approximately 1.5 inches. Each finger 54 has a width of about 1 inch. Each finger 54 is less than half as wide as a bottle 18. When adjacent fingers 54 are in a non-flared state, the gap between fingers is approximately 0.5 inches. The shortest finger in a wedge 50 has almost no length in its extended portion; the extended portion of the longest finger 54 has a length of about 4 and $^{5}/_{8}$ inches. The difference between the length of the longest finger 54 and the shortest finger 54 approximates the width of a bottle 18 measured perpendicular to infeed direction 20; for example, the short-side width of bottle 18 as transported on infeed conveyor 12.

Fingers 54 are formed UHMW (ultra-high molecular weight) plastic. Metal bolts through the base of the finger rigidly affix the finger to wedge belt 40.

Wedge belt 40 is drawn sufficiently taut between drive wheel 44 and idle wheel 46 that interface region 48 is substantially planar as wedge belt 40 is driven. Retaining clips help keep wedge belt 40 aligned despite downward force exerted by the weight of fingers 54.

Wedge profile conveyor 14 includes a frame that is movable relative to infeed conveyor 12 along track 66. Hand cranks 68 and 69 are attached to threaded rods at opposing ends of wedge profile conveyor 14. Threaded rods join wedge profile conveyor 14 to infeed conveyor 12. By rotating hand cranks 68 and 69, a human operator can adjust the distance between wedge profile conveyor 14 and infeed conveyor 12. In particular, this adjustment changes the relationship of pushing face 52 to offload edge 70.

Infeed conveyor 12 has an offload edge 70. Offload edge 70 presents a substantially straight profile when viewed from above. Pushing face 52 approximates the shape of offload edge 70.

Each wedge 50 has a wedge angle 72. When wedge 50 is on a substantially straight portion of wedge belt 40, pushing face 52 is substantially planar and wedge 50 has a substantially triangular profile when viewed from above.

Intersection angle 74 is the angle at which wedge belt 40 crosses the infeed direction 20 in interface region 48, when viewed from above. Intersection angle 74 is approximately equal to wedge angle 72. One effect of this approximate equality is that pushing face 52 is approximately parallel to offload edge 70 when wedge 50 travels through interface region 48. Furthermore, wedge profile conveyor 14 is positioned relative to the infeed conveyor 12 such that, when the leading tip of wedge 50 is approximately aligned opposite row stop 28, and when pushing face 52 is pushing a group 24 of bottles 18 off infeed conveyor 12, pushing face 52 places the centers of mass of bottles 18 directly over offload edge 70.

Transfer apparatus 10 can be adjusted to various sizes of bottles 18. An alignment of transfer apparatus 10 that places bottles 18 of a first size at a given position on offload edge 70 may not place bottles 18 of a different size at the same position on offload edge 70. For example, if a different bottle size has a different distance from its center of mass to its side that contacts pushing face 52, then the center of mass will reach offload edge 70 at a different location. Hand cranks 68 and 69 can re-position wedge profile conveyor 14 relative to infeed conveyor 12 such that pushing face 52 pushes groups 24 over offload edge 70 at a desired location.

Dead plate 26 lies almost flush along infeed conveyor 12 along offload edge 70, for example at a distance of less than 0.125 inches. Dead plate 26 has an upper surface that inclines away from offload edge 70, for example at an angle of six to seven degrees. There is a tradeoff in the choice of the angle of incline, since a steeper angle tends to clear bottles 18 from dead plate 26 faster, but too steep an incline can cause bottles 18 to topple. Dead plate 26 is inclined at approximately the steepest angle at which the described bottles 18 can be tilted without toppling bottles 18.

The underside of dead plate 26 contacts the surface of mass flow conveyor 16. Dead plate 26 is kept in close contact with this surface under elastic tension within dead plate 26. That is, dead plate 26 is bent upward slightly by mass flow conveyor 16.

Infeed conveyor 12 transports bottles 18 in a source direction before turning the flow of bottles 18 into infeed direction 20 at curve 38. Curve 38 allows infeed conveyor to guide bottles 18 into interface region 48, thereby avoiding putting bottles 18 in an area around idle wheel 46 where fingers 54 interact with bottles 18 inconsistently, due to varying finger lengths and the flexing of wedge belt 40. In particular, when wedge belt 40 travels around idle wheel 46, each finger 54 forms a moment arm. The pushing tip 56 develops a higher angular velocity than the wedge belt 40 to which it is attached. Thus, the pushing tip 56 of a finger 54 on idle wheel 46 travels faster than pushing tips 56 in interface region 48. When bottles 18 come into contact with such higher-velocity fingers 54, the different velocity imparts a force that is higher, and in a different direction, than the force imparted by fingers 54 in interface region 48. Fingers 54 rounding the idle wheel 46 can "slap" the bottles 18. Since fingers 54 are of progressively longer lengths, the slapping effect increases for fingers 54 toward the trailing end of each wedge 50. The variation in force due to slapping can push bottles 18 out of alignment with one another and out of contact, at least temporarily with fingers 54.

However, the region in which the slapping effect can occur is limited to the area around idle wheel 46 defined by the reach of the longest finger 54 beyond wedge belt 40 for the portions of wedge belt 40 that are in direct contact with idle wheel 46.

Transfer apparatus 10 also includes overflow table 76, photo eye, and downed bottle dead plate 80. Overflow table 76 is positioned upstream of mass flow conveyor 16, relative to the flow of bottles 18. When more bottles arrive from infeed conveyor 12 than are removed by either dead plate 26 or mass flow conveyor 16, or both, for instance due to a blockage on mass flow conveyor 16, congestion occurs, causing bottles 18 to back up onto overflow table 76. Photo eye detects the presence of bottles on overflow table 76.

Photo eye notifies a programmable logic controller, which shuts down the flow of bottles 18 into transfer apparatus 10.

Downed bottle dead plate 80 helps control downed bottles 18 in a region between the end of the guide rails on infeed conveyor 12 and the area in which wedge belt 40 overlaps infeed conveyor. Were downed bottle dead plate 80 absent, a downed bottle 18 could roll into this region, when, for instance, the shortest fingers 54 of a wedge 50 were passing idle wheel 46. In this configuration, a temporary gap would exist between wedge 50 and infeed conveyor 12—a gap which would close as wedge belt 40 advances and the longer fingers 54 of wedge 50 sweep through. A downed bottle 18 in this temporary gap could drop down and become jammed between wedge 50 and infeed conveyor 12 once the longer fingers 54 arrive. Downed bottle dead plate 80, however, approximately extends the plane of the upper surface 36, eliminating the gap. When a downed bottle 18 enters this region, downed bottle dead plate 80 supports the downed bottle 18 until the longer fingers 56 push the downed bottle 18 back onto infeed conveyor 12.

In use, infeed conveyor 12 transports a steady flow of bottles 18 resting on upper surface 36 in infeed direction 20. The bottles 18 are transported consecutively, in single-file order, such that their centers are approximately on an infeed line 82. The speed of transport can be between 100 and 800 bottles per minute, for instance. Interface region 48 intersects infeed line 82. The motion of wedge belt 40 in belt direction 49 brings a wedge 50 into interface region 48, where pushing face 52 contacts a group 24 of the bottles 18 arranged in infeed line 82. The pushing face 52 selects a bottle 18 for membership in group 24 if the bottle 18 is within the length of the wedge 50 from the front of the line 82. For example, for a steady flow of bottles in mutual contact along line 82, approximately 26 bottles 18 can fit along the ten-foot length of each wedge 50.

The progress of wedge belt 40 causes the pushing face 52 of wedge 50 to sweep across infeed conveyor 12. Pushing face 52 pushes group 24 off infeed line 82 and toward offload edge 70. Pushing face 52 aligns group 24 in a row that conforms in shape to offload edge 70, such that the bottles 18 in group 24 each reach offload edge 70 at substantially the same time. In particular, the centers of mass of the bottles 18 in group 24 reach offload edge 70 at substantially the same time.

When the center of mass of a bottle 18 crosses offload edge 70, the bottle 18 tips from the incline of upper surface 36 (which tilts toward wedge 50) to the incline of dead plate 26 (which tilts away from wedge 50). Bottle 18 ceases to rest on infeed conveyor 12 and instead transfers to dead plate 26. After this transfer, infeed conveyor 12 no longer conveys its force to bottle 18 in infeed direction 20. Friction of bottle 18 upon dead plate 26 creates a braking force on the movement of the bottle 18.

Bottles 18 are also arrested by row stop 28. Wedge profile conveyor 14 is arranged so that pushing face 52 pushes its group 24 toward a potential transfer location across offload edge 70 that is slightly (for example, less than a bottle length) downstream of row stop 28, relative to infeed direction 20. Row stop 28 obstructs group 24 before group 24 can reach the potential transfer location. When the foremost bottle 18 in group 24 contacts row stop 28, group 24 stacks up against row stop 28 and pushing face 52. This stacking causes group 24 to close ranks into mutual contact while crossing offload edge 70 onto dead plate 26. This stacking also aligns groups 24 relative to one other, since each group 24 becomes aligned relative to the row stop 28.

Row stop 28 is positioned sufficiently close to infeed conveyor 12 and dead plate 26 that row stop 28 obstructs bottles 18 on infeed conveyor 12 and dead plate 26, including bottles 18 rolling on their sides. However, row stop 28 does not obstruct wedges 50.

When group 24 is obstructed by row stop 28, wedge 50 continues its motion, which can cause it to rub against obstructed group 24. The rounding of pushing tips 56 of fingers 54 reduces wear of wedge 50 against bottles 18.

Bottles 18 in group 24 proceed down the incline of dead plate 26 and toward mass flow conveyor 16. Bottles 18 are impelled down the incline by the force of gravity as well as by momentum from pushing face 52. If any bottles 18 do not proceed across dead plate 26, a subsequent group 24 arriving off infeed conveyor 12 contacts such stray bottles 18 from behind. If the subsequent group 24 is in contact with both stray bottles 18 and pushing face 52, the force from pushing face 52 will push both subsequent group 24 and stray bottles 18 toward mass flow conveyor 16. Eventually, even if gravity and momentum are not moving bottles 18 across dead plate 26 and even if the number of bottles 18 on dead plate 26 is initially sparse, enough subsequent groups 24 arrive to populate dead plate 26 and establish a chain of mutual contact between bottles 18 that leads back to pushing face 52. In this case, the chain of contact allows pushing face 52 to push all bottles 18 on dead plate 26 toward mass flow conveyor 16.

Mass flow conveyor 16 receives bottles 18 from dead plate 26 and conveys them in outflow direction 22 at a speed of 4 fpm.

The rates of bottles 18 transported per minute by infeed conveyor 12 and mass flow conveyor 16, respectively, depend on bottle dimensions and the average gaps between bottles 18. The rate of bottles 18 transported into transfer apparatus 10 by infeed conveyor 12 can be as high as the rate of bottles 18 removed from transfer apparatus 10 by mass flow conveyor 16.

When bottles 18 arrive on infeed conveyor 12 in approximately continuous mutual contact, and when pushing face 52 is nearly as long as mass flow conveyor 16 is wide, transfer apparatus 10 selects groups 24 that approximately span the surface of mass flow conveyor 16 and transfers the groups 20 to mass flow conveyor 16.

The spacing between groups 24 on mass flow conveyor 16 is a function of the speed of mass flow conveyor 16. When mass flow conveyor 16 picks up groups 24 at a speed that keeps groups 24 mutually close on mass flow conveyor 16, and for sufficiently dense input of bottles 18, the groups 24 approximately cover the surface of mass flow conveyor 16. That is, the density of bottles 18 on mass flow conveyor 16 is close to optimal.

Bottles 18 can arrive sporadically, for instance due to the removal of some bottles 18 from the flow due to quality control. In this case, transfer apparatus 10 operates as described, although a given operation of pushing face 52 to select a group 24 might net fewer bottles 18 than the maximum possible number. Therefore, the density of bottles 18 on mass flow conveyor 16 can decline for sporadic inputs.

Similarly, increasing the speed at which wedge belt 40 moves will cause each operation of pushing face 52 to encounter fewer bottles 18 while select a group 24. The average population of a group 24 can decline in this way.

Other embodiments are within the claims. For example, although the described embodiment conveys articles that are bottles, in alternative embodiments the articles could be containers (such as pie containers), bread loafs, boxes, or bundles of products. Also, in the described embodiment, each bottle 18 is a 64-ounce non-round container. In alternative embodiments, bottles 18 could be round. Bottles 18 could be a different size, for instance 48-ounce, or gallons.

Referring now to FIGS. 5A and 5B, in an alternative embodiment, wedge profile conveyor 84 transfers groups 24 of bottles 18 off infeed conveyor 12 and toward mass flow conveyor 16. Wedge profile conveyor 84 separates bottles 18 into groups of two or more.

Wedge profile conveyor 84 is positioned to intercept bottles 18 carried by infeed conveyor 12. Wedge profile conveyor 84 includes horizontal idle wheel 84a, horizontal drive wheel 84b, and horizontal wedge belt 84c, which is an endless loop belt wrapped around horizontal idle wheel 84a and horizontal drive wheel 84b. Horizontal drive wheel 84b drives horizontal wedge belt 84c.

Wedge profile conveyor 84 includes three horizontal wedges 86 affixed to horizontal wedge belt 84c. The length of each horizontal wedge 86 approximates the maximum length of a group 24 to be selected by horizontal wedge 86. The length of horizontal wedge 86 is slightly less than the width of mass flow conveyor 16; for example, horizontal wedge 86 is approximately 10 feet long.

Each horizontal wedge 86 includes a pushing face comparable in function to pushing face 52 of wedge 50. Each horizontal wedge 86 also includes horizontal fingers 86a of different lengths.

Each horizontal finger 86a is an elongated rod with a rectangular cross-section. Each horizontal finger 86a includes a base portion and an extended portion. The base portion affixes to horizontal wedge belt 84c such that the elongated dimension of horizontal fingers 86a is approximately horizontal. All horizontal fingers 86a, regardless of overall length, have similarly shaped base portions. The extended portion extends horizontally away from horizontal wedge belt 84c. Horizontal fingers 86a vary in the lengths of their extended portions. The lengths of the extended portions of horizontal fingers 86a are comparable to the lengths of the extended portions of fingers 54. Furthermore, horizontal fingers 86a within a given horizontal wedge 86 are ordered similarly to fingers 56 within a wedge 50, that is, in order of increasing length.

Each horizontal finger 86a has a pushing tip opposite the base portion, comparable in form and function to pushing tip 56 of finger 54.

The relative position of adjacent horizontal fingers 86a can change when horizontal wedge belt 84c flexes. The horizontal fingers 86a are movable, such that when a portion of horizontal wedge belt 84c containing adjacent horizontal fingers 86a travels around horizontal idle wheel 84a or horizontal drive wheel 84b, the horizontal fingers 86a roll through the 180° arc described by the perimeter of each wheel, after which the horizontal fingers 86a are inverted relative to their counterparts on the opposite side of horizontal wedge belt 84c.

Horizontal wedge belt 84c includes a timing belt comparable in form and function to timing belt of wedge belt 40. Horizontal fingers 86a are bolted to horizontal wedge belt 84c.

Horizontal fingers 86a are formed UIHMW (ultra-high molecular weight) plastic. Metal bolts through the base of the finger rigidly affix the finger to horizontal wedge belt 84c.

Horizontal wedge belt 84c is supported between horizontal idle wheel 84a and horizontal drive wheel 84b such that portions not in contact with wheels 84a or 84b are substantially planar.

As with wedge profile conveyor 14, wedge profile conveyor 84 includes a frame that is movable relative to infeed conveyor 12 with hand cranks. A human operator can adjust the distance between wedge profile conveyor 14 and infeed conveyor 12. In particular, this adjustment changes the relationship of pushing face of horizontal wedge 86 to offload edge 70.

In use, wedge profile conveyor 84 selects groups of bottles and transfers the groups off infeed conveyor 12 over offload edge 70 in a manner comparable to wedge profile conveyor 14. In particular, while in contact with bottles 18, the interaction with bottles of horizontal wedges 86 is similar to that of wedges 50.

In alternative embodiments, wedge profile conveyor 84 could have more than three horizontal wedges 86.

In alternative embodiments, horizontal wedge 86 could be flexible without including fingers 86a, for example by including a series of hinged segments.

In alternative embodiments, horizontal wedge belt 84c could include a different sort of belt, for example an endless loop of tabletop chain.

Referring now to FIG. 6, in an alternative embodiment, three-pulley wedge conveyor 88 transfers groups 24 of bottles 18 off infeed conveyor 90 and toward mass flow conveyor 16. Wedge profile conveyor 84 separates bottles 18 into groups of two or more.

Three-pulley wedge conveyor 88 includes idle wheel 88a, intermediate wheel 88b, drive wheel 88c, and wedge belt 88d. In form and function, idle wheel 88a and drive wheel 88c are comparable to idle wheel 46 and drive wheel 44 of wedge profile conveyor 14, respectively. Wedge belt 88d loops around each of idle wheel 88a, intermediate wheel 88b, and drive wheel 88c. Wedge belt 88d is otherwise comparable to wedge belt 40. Three-pulley wedge conveyor 88 includes three wedges 50 attached to wedge belt 88d.

Intermediate wheel 88b is arranged between idle wheel 88a and drive wheel 88c such that when viewed from above, wedge belt 88d forms an approximate triangle. Wedge belt 88d flexes when in contact with intermediate wheel 88b, such that intermediate wheel 88b divides the portion of wedge belt 88d that faces oncoming bottles 18 into two substantially planar portions. The region between intermediate wheel 88b and drive wheel 88c is comparable to interface region 48.

Infeed conveyor 90 is comparable in form and function to infeed conveyor 12, except that infeed conveyor 90 lacks curve 38. As described with regard to idle wheel 46, intermediate wheel 88b can impart a moment arm to fingers 54 of a wedge 50. A finger in motion on wedge belt 88d as it rounds intermediate wheel 88b can slap bottles that are within reach.

In use, three-pulley wedge conveyor 88 selects groups of bottles and transfers the groups off infeed conveyor 90 over an offload edge comparable in form and function to offload edge 70. In particular, while in contact with bottles 18, the interaction with bottles by wedges of three-pulley wedge conveyor 88 is similar to that of wedge profile conveyor 14.

Figure 7C:
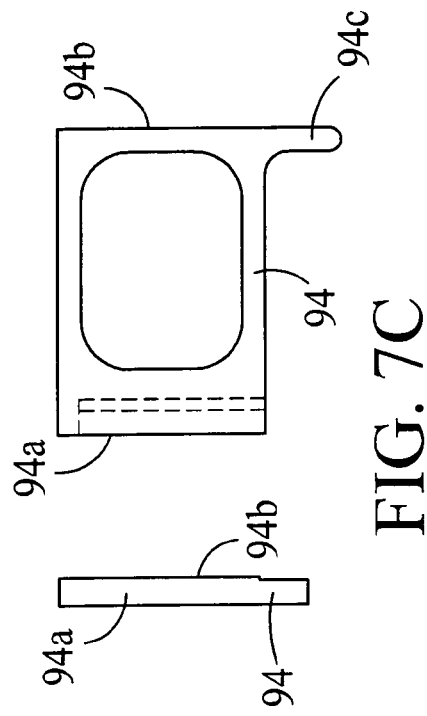
FIGS. 7A–7D are side views of alternative fingers.
Figure 7D:
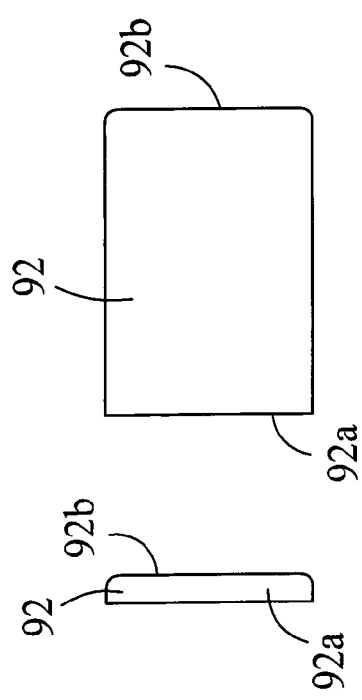
Figure 7B:
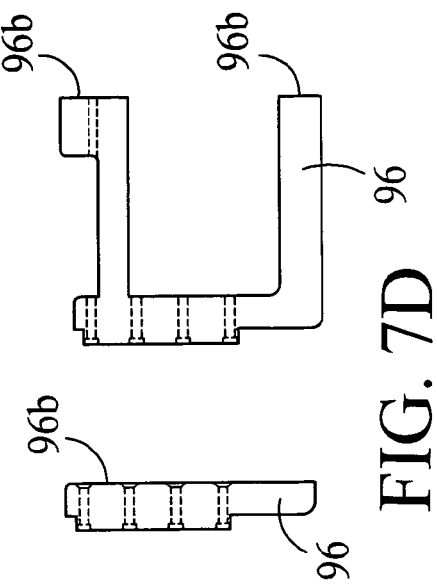
Figure 7A:
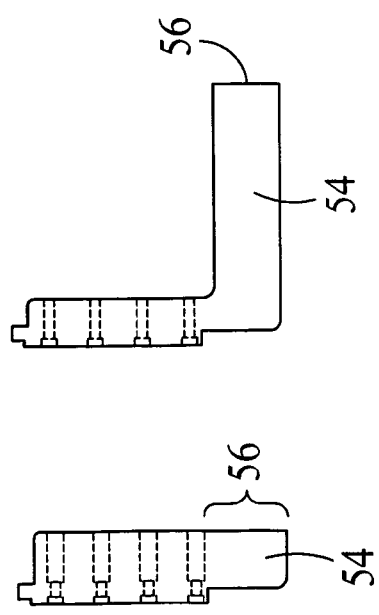

Referring now to FIG. 7, fingers 54 have an L-shaped profile when viewed from the side. FIG. 7 shows side views of examples of alternate shapes for fingers in wedge 50: namely, a solid rectangle finger 92, a flag outline finger 94, and a U-shaped finger 96. Each such finger has a base 92a, 94a, or 96a, respectively, through which it is bolted to wedge belt 40. Each such finger also has a pushing tip 92b, 94b, or 96b, respectively, which functions in use like pushing tip 56 of finger 54. That is, it contacts bottles 18 and forms a portion of pushing face 52 of wedge 50. For fingers 62, 64, and 96, FIG. 7 shows both a shortest example and a longest example, in terms of extension away from wedge belt 40.

In described embodiments, fingers 54, 86a, 92, 94, and 96 are each cut from UHMW plastic by a high-pressure jet of water.

Solid rectangle finger 92 is a single slab, approximate rectangular when viewed from the side.

The profile of flag outline finger 94 is largely rectangular, with the addition of a lower extension 94c along pushing tip 94b. The interior of flag outline finger 94 is cut away, which reduces weight, for example relative to a solid rectangle finger 92 of comparable outer dimensions.

U-shaped finger 96 has multiple pushing tips 96b. In use, for bottles 18 of sufficient height, U-shaped finger 96 contacts bottles 18 with both pushing tips 96b.

In described embodiments, wedge belt 40 is a timing belt. In alternative embodiments, wedge belt 40 could be another kind of endless loop, for example a tabletop chain.

In described embodiments, infeed conveyor 12 is an endless loop, but in alternative embodiments, infeed conveyor 12 could be another kind of transporter of articles, for example a series of motorized rollers. Likewise, in described embodiments, mass flow conveyor 16 is an endless loop, but in alternative embodiments, mass flow conveyor 16 could be another kind of transporter of articles, for example a series of motorized rollers.

In described embodiments, mass flow conveyor 16 transports bottles 18 into a cooler. In alternative embodiments, mass flow conveyor 16 could transport bottles 18 to another destination, for example a tunnel pasteurizer or a packing machine. Also, in described embodiments, mass flow conveyor 16 is slightly more than 10 feet wide. In alternative embodiments, mass flow conveyor 16 could be narrower or wider, for example 2, 4, 6, 8, 12, 14, or 16 feet wide, or more.

In described embodiments, upper surface 36 is inclined toward wedge profile conveyor 14 at an angle of one or two degrees. In alternative embodiments, upper surface 36 could be horizontal, i.e., not inclined, or inclined at an angle of less than one degree. Alternatively, upper surface 36 could be inclined toward wedge profile conveyor 14 more steeply, for example at an angle of 5 degrees or more.

In described embodiments, each finger 54 is less than half as wide as a bottle 18. In alternative embodiments, fingers 54 could be wider relative to bottles 18, for example, 50% as wide, 75% as wide, equally as wide, 125% as wide, and so forth. Moreover, in described embodiments, fingers 54 are L-shaped when viewed from the side. Referring now to FIG. 7, in alternative embodiments, fingers 54 could be C-shaped, E-shaped, or flag-shaped when viewed from the side. A finger 54 could have multiple pushing tips 56.

In described embodiments, wedge 50 includes fingers 54 that are separable. In alternative embodiments, wedge 50 could be substantially undivided, for example manufactured of a flexible material that allows wedge 50 to flex around a wheel without flaring apart.

In described embodiments, wedge belt 40 has three wedges 50. In alternative embodiments, wedge belt 40 could include more than three wedges 50, for example four wedges, or five, or more.

In described embodiments, dead plate 26 has an upper surface that inclines away from offload edge 70 at an angle of six to seven degrees. In alternative embodiments, dead plate 26 could have a different inclination or no inclination at all. For example, dead plate 26 could incline away from offload edge 70 at an angle of 1, 2, 3, 4 or 5 degrees. Alternatively, dead plate 26 could incline away from offload edge 70 at an angle of 8, 10, 12, 15, or 20 degrees or more. Moreover, dead plate 26 is optional. In alternative embodiments, articles may be transferred directly from infeed conveyor 12 to mass flow conveyor 16.

In described embodiments, infeed direction 20 is substantially linear over the portions of the infeed conveyor 12 that are next to the mass flow conveyor 16. However, in alternative embodiments, infeed conveyor 12 may be curved. Also, infeed conveyor 12 need not be straight in portions away from mass flow conveyor 16 and wedge profile conveyor 14.

In described embodiments, mass flow conveyor 16 and an infeed conveyor 12 are approximately coplanar and horizontal. However, in alternative embodiments, mass flow conveyor 16 and an infeed conveyor 12 could be tilted from the horizontal.

Accordingly, other embodiments are within the scope of the following claims.

What is claimed is:

1. An apparatus, comprising:
   (a) a first transporter that transports articles in a line; and
   (b) a rotator belt including three wedges positioned to intersect the line of articles, each wedge including a face that contacts a plurality at least six of the articles in the line to separate the contacted articles into a group and to remove the separated group from the line while the articles continue to be transported.

2. The apparatus of claim 1, wherein each wedge comprises separated elements extending from the rotator belt.

3. The apparatus of claim 2, wherein the elements are of different lengths.

4. The apparatus of claim 2, wherein each wedge comprises ten of the elements.

5. The apparatus of claim 1, wherein each wedge pushes the separated group off an edge of the transporter, and each face has a shape generally corresponding to the shape of the edge.

6. The apparatus of claim 5, wherein the length of the face is between 60% and 99% of the length of the edge.

7. The apparatus of claim 1, further comprising a blocking member positioned to obstruct the articles as the transporter transports the articles.

8. The apparatus of claim 1, further comprising a blocking member positioned to obstruct the articles but not the wedges as the transporter transports the articles.

9. The apparatus of claim 1, wherein the transporter has an upper surface for receiving the articles and the upper surface is inclined toward the rotator belt.

10. The apparatus of claim 1, further comprising a receiving member near the transporter for receiving each removed group.

11. The apparatus of claim 10, wherein the transporter has an upper surface for supporting the articles and the receiving member inclines away from the upper surface.

12. The apparatus of claim 10, wherein the receiving member comprises a plate.

13. The apparatus of claim 12, wherein the plate is stationary.

14. The apparatus of claim 1, further comprising a second transporter for receiving and transporting the groups of articles removed from the first transporter.

15. The apparatus of claim 14, wherein the first transporter transports the articles in a first direction and the second transporter transports the groups of articles removed from the first transporter in a second direction.

16. The apparatus of claim 15, wherein the second direction is approximately orthogonal to the first direction.

17. The apparatus of claim 1, further comprising:
   (c) a receiving member near the transporter for receiving each group of articles removed from the first transporter; and
   (d) a second transporter for receiving and transporting the groups after the groups pass over the receiving member.

18. The apparatus of claim 1, wherein the first transporter is angled at approximately the position at which each wedge intersects the line of articles.

19. A method of transporting articles, comprising:
   (a) transporting a line of articles in a first direction; and
   (b) simultaneously separating a group of the articles from the line and transferring the group of articles out of the line and to a plate while the line continues to be transported in the first direction, the articles of the transferred group arriving at the plate at substantially the same time.

20. The method of claim 19, wherein the articles are selected from the group consisting of bottles, cans, containers, cartons, and loaves.

21. The method of claim 19, wherein the articles include cans.

22. The method of claim 19, wherein the articles include containers.

23. The method of claim 19, wherein the articles include cartons.

24. The method of claim 19, wherein the articles include bottles.

25. The method of claim 24, wherein the bottles have a cross-section that is substantially circular.

26. The method of claim 25, wherein the bottles have a diameter of from approximately 0.5 inches to 24 inches.

27. The method of claim 25, wherein the bottles have a diameter of from approximately 2 inches to 16 inches in the widest cross-section.

28. The method of claim 24, wherein the bottles have a cross-section that is substantially rectangular.

29. The method of claim 28, wherein the bottles are transported short-side first in the first direction.

30. The method of claim 29, wherein the bottles are separated and transferred out of the line by a wedge including the face that intersects the line, and the depth of the wedge is approximately the length of the short side.

31. The method of claim 19, wherein the second direction is approximately orthogonal to the first direction.

32. The method of claim 19, wherein transporting the line of articles in a first direction includes transporting the line of articles at a first speed in the first direction, and pushing the articles in the second direction includes pushing the articles at a second speed in the second direction, the second speed having a vector component speed in the first direction approximately equal to the first speed.

33. The method of claim 19, wherein the group of articles is transported in a second direction after being transferred from the line.

34. The method of claim 33, wherein the line of articles are transported in the first direction at a first speed and the group of articles are transported in the second direction at a second speed.

35. The method of claim 34, wherein the first speed is from 10 fpm to 400 fpm and the second speed is from 2 fpm to 30 fpm.

36. The method of claim 34, wherein the first speed is at least 5 times the second speed.

37. The method of claim 36, wherein the articles are bottles that have been filled with a beverage and heated prior to separating the group and transferring the group, wherein the group of bottles are transported in the second direction into a cooler.

38. The method of claim 37, wherein groups of bottles are massed together as they are transported in the second direction into the cooler.

39. The method of claim 36, wherein the first speed is at least 20 times the second speed.

40. The method of claim 19, further including transporting a group of articles in a third direction such that, for a prior group of articles that is transferred before a subsequent group is transferred, the prior group and the subsequent group belonging to the groups of articles, the prior group is transported in the third direction before the subsequent group.

41. An apparatus, comprising:
(a) a first transporter that transports articles in a line; and
(b) a member that separates the articles in the line into groups and removes the groups from the line while the articles continue to be transported, the member including a rotator belt positioned to intersect the line of articles, to separate the articles into the groups, and to remove the groups from the line, the rotator belt including wedges that separate the articles into groups and that push the groups out of the line, each wedge having a face that contacts the articles in the group when the edge pushes the group out of line, each wedge pushing the group off an edge of the transporter, the face having a shape generally corresponding to the shape of the edge, wherein the length of the face is between 60% and 99% of the length of the edge.

42. An apparatus, comprising:
(a) a first transporter that transports articles in a line;
(b) a member that separates the articles in the line into groups and removes the groups from the line while the articles continue to be transported, the member including a rotator belt positioned to intersect the line of articles, to separate the articles into the groups, and to remove the groups from the line, the rotator belt including wedges that separate the articles into groups and that push the groups out of the line; and
a blocking member positioned to obstruct the articles but not the wedges as the transporter transports the articles.

43. An apparatus, comprising:
(a) a first transporter that transports articles in a line; and
(b) a member that separates the articles in the line into groups and removes the groups from the line while the articles continue to be transported, the member including a rotator belt positioned to intersect the line of articles, to separate the articles into the groups, and to remove the groups from the line;
wherein the transporter has an upper surface for receiving the articles and the upper surface is inclined toward the rotator belt.

44. An apparatus, comprising:
(a) a transporter that transports articles in a line;
(b) a member that separates the articles in the line into groups and removes the groups from the line while the articles continue to be transported; and
(c) a receiving member near the transporter for receiving each removed group;
wherein the transporter has an upper surface for supporting the articles and the receiving member inclines away from the upper surface.

45. An apparatus, comprising:
(a) a transporter that transports articles in a line;
(b) a member that separates the articles in the line into groups and removes the groups from the line while the articles continue to be transported, the member including a rotator belt positioned to intersect the line of articles, to separate the articles into the groups, and to remove the groups from the line;
wherein the transporter is angled at approximately the position at which the rotator belt intersects the line of articles.

46. A method of transporting articles, comprising:
(a) transporting a line of articles, including bottles that are substantially rectangular, in a first direction; and
(b) simultaneously separating a group of the articles including the bottles from the line and transferring the group of the articles out of the line while the line continues to be transported in the first direction;
wherein the bottles are transported short side first in the first direction, wherein the bottles are separated and transferred out of the line by a wedge that intersects the line, and the depth of the wedge is approximately the length of the short side.

47. A method of transporting articles, comprising:
(a) transporting a line of articles in a first direction; and
(b) simultaneously separating a group of the articles from the line and transferring the group of articles out of the line while the line continues to be transported in the first direction, wherein the group of articles is transported in a second direction after being transferred from the line, and wherein the line of articles is transported in the first direction at a first speed and the group of articles are transported in the second direction at a second speed, wherein the first speed is from 10 fpm to 400 fpm and the second speed is from 2 fpm to 30 fpm, wherein the first speed is at least 5 times the second speed.

48. The method of claim 47, wherein the first speed is at least 20 times the second speed.

49. The method of claim 47, wherein the articles are bottles that have been filled with a beverage and heated prior to separating the group and transferring the group, wherein the group of articles are transported in the second direction into a cooler.

50. The method of claim 49, wherein groups of articles are massed together as they are transported in the second direction into the cooler.

51. A method of transporting articles, comprising:
(a) transporting a line of articles in a first direction; and
(b) contacting a group of the articles with a face that simultaneously separates a group of the articles from the line and transfers the group of articles out of the line while the line continues to be transported in the first direction, wherein simultaneously separating and transferring includes pushing the articles in a second direction different from the first direction, and wherein transporting the line of articles in a first direction includes transporting the line of articles at a first speed in the first direction, and pushing the articles in the second direction includes pushing the articles at a second speed in the second direction, the second speed having a vector component speed in the first direction approximately equal to the first speed.

52. The method of claim 51, wherein the articles are selected from the group consisting of bottles, cans, containers, cartons, and loaves.

53. The method of claim 52, wherein the articles include bottles.

54. A method of transporting articles, comprising:
(a) transporting a line of articles in a first direction; and
(b) simultaneously separating a group of the articles from the line and transferring the group of articles out of the line while the line continues to be transported in the first direction, wherein the group of articles is transported in a second direction after being transferred from the line, and wherein the line of articles is transported in the first direction at a first speed and the group of articles are transported in the second direction at a second speed, wherein the first speed is at least 5 times the second speed.

55. The method of claim 54, wherein the articles are selected from the group consisting of bottles, cans, containers, cartons, and loaves.

56. The method of claim 55, wherein the articles include bottles.

57. An apparatus, comprising:
(a) a first transporter that transports articles in a line; and
(b) a rotator belt including wedges positioned to intersect the line of articles, each wedge including a face that contacts a plurality of the articles in the line to separate the contacted articles into a group and to remove the separated group from the line while the articles continue to be transported, each wedge comprising separated elements of different lengths extending from the rotator belt.

* * * * *